(No Model.)

H. H. BEACH.
COFFEE POT.

No. 284,363. Patented Sept. 4, 1883.

Witnesses.
Robert Everett
E. H. Dick

Inventor:
Henry H. Beach.
By Macullar Bailey
his Atty

UNITED STATES PATENT OFFICE.

HENRY H. BEACH, OF ROME, NEW YORK.

COFFEE-POT.

SPECIFICATION forming part of Letters Patent No. 284,363, dated September 4, 1883.

Application filed February 20, 1883. (No model.)

*To all whom it may concern:*

Be it known that I, HENRY H. BEACH, of Rome, Oneida county, New York State, have invented a certain new and useful Improvement in Coffee-Pots, of which the following is a specification.

My invention is directed to means whereby the aromatic vapor generated during the operation of boiling coffee can be condensed and retained in the pot. For this purpose it has heretofore been not unusual to provide a receptacle for cold water in the coffee-pot, sometimes in the body of the pot itself and sometimes in the cover.
My improvement consists in a coffee-pot cover of special form, which is particularly well adapted both to hold the condensing medium and to present it to the coffee-vapor under the best conditions, and which is also so combined with the coffee-pot as to constitute the means by which the opening between the pot and its discharge-spout is closed, thus retaining all the coffee-vapor within the pot during the boiling operation. In this way I condense and retain all the aroma of the coffee, while at the same time the water containing the coffee is prevented from boiling, which permits the extraction of all the caffeine, while leaving the tannic acid in the grounds.
I here remark that a condensing-cover adapted to close the discharge-spout is not broadly new with me. My improvement resides, as hereinbefore indicated, in the special form of cover which I have devised for the purpose, which cover I shall now proceed to describe by reference to the accompanying drawings, in which—

Figure 1:
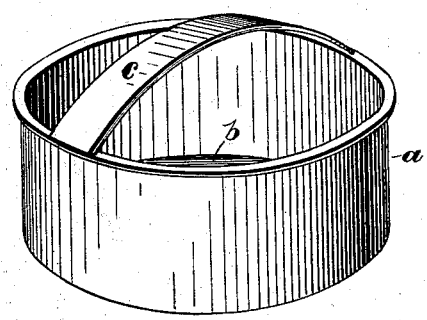
Figure 2:
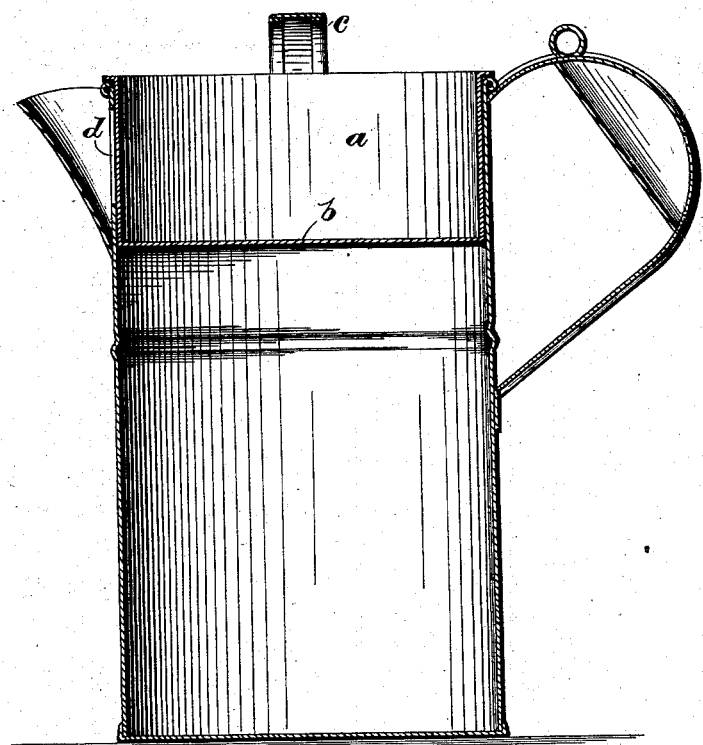

Figure 1 is a perspective view of the cover. Fig. 2 is a vertical central section of a coffee-pot with the cover applied thereto.

The cover is a cylindrical cup-shaped device, having an entirely open top, vertical sides *a*, and a bottom, *b*. It also has a handle, *c*, by which it can be applied to and removed from the pot. The water which serves to condense the coffee-vapor within the pot is put into this cover. The walls of the pot, at the top, are made of a shape and size corresponding to the walls or sides of the cover, so that the latter, when in place, will fit closely and snugly within the pot, with its sides in close contact with the walls of the pot, thus exposing only its bottom *b* to contact with the vapor in the pot.

In order to make the condensing-cover practically effective for the purpose for which it is designed, there are two indispensable conditions.

First, the vapor in the pot must not be permitted to surround the cover, for in that case the water in it will heat too soon. It is to obviate this objection that I make the walls of the pot, and also the sides of the condensing-cover, perpendicular, and fit the latter closely within the pot, so that the contact of the rising vapor with the cover is confined to the bottom *b* exclusively.

Secondly, the imperceptible vapor which arises from the water, if not allowed perfectly free escape, acts as an agent to hasten the undue heating of the water, and thus to unfit it for exercising the proper condensing action.

In a closed condensing-cover of ordinary form, where the coffee-vapor surrounds its sides and bottom, its contained water will rise to the temperature of 170° Fahrenheit in less than five minutes, and will be at the boiling-point long before the operation of boiling the coffee is concluded; and even with my cover of the improved form and containing capacity represented in the drawings, if the cover be closed, it will not be effective as a condenser for the full length of time required; and the same is true if instead of closing the cover entirely, a hole be left in the top, through which the cover can be filled and emptied. Under my perfected arrangement, however, during the whole of the coffee-boiling operation, which lasts usually about twenty minutes, the water in the cover is held at a temperature which does not at any time exceed 170° Fahrenheit, and it consequently serves effectively as a condensing medium.

In order to prevent escape of coffee-vapor from the spout during the boiling operation, I close the spout by means of the cover, which thus has a twofold function. The hole *d*, through which the spout communicates with the interior of the pot, is so placed with reference to the cover that the latter, when fitted in place, will tightly close the hole, and will thus serve to virtually seal the pot against escape of the aromatic vapor, which latter consequently is retained and condensed in the pot.

It will be noted that the bottom $b$ of the condensing-cover extends below the opening $d$, and that consequently this opening is closed by the walls $a$ of the condensing-cover in contradistinction to an extension of those walls below the bottom, as has been essayed in some cases, and thus the steam and vapor within the pot will be condensed by contact with the bottom of the cover at a point below the opening $d$, and consequently will not be in a condition to sift through the joint between the opening $d$ and the walls, which cannot practically be made steam or vapor tight. After the coffee is made the condensing-cover is removed and replaced by an ordinary cover, which, in practice, accompanies the pot.

What I claim as new and of my invention is—

The combination, with the pot provided with a discharge-spout leading into the pot at or near the upper end of the latter, of the open-top condensing-cover, adapted to fit closely within the pot with its bottom $b$ below said opening, so as to close with its walls $a$ the opening through which the spout communicates with the interior of the pot, substantially as hereinbefore set forth.

In testimony whereof I have hereunto set my hand this 15th day of February, 1883.

HENRY H. BEACH.

Witnesses:
 JAMES H. SEARLES,
 WM. H. LEWIS.